(12) United States Patent
Ruiz et al.

(10) Patent No.: US 10,800,543 B2
(45) Date of Patent: Oct. 13, 2020

(54) PASSENGER COMMUNICATION SYSTEM

(71) Applicant: Safran Seats USA LLC, Gainesville, TX (US)

(72) Inventors: Oscar Ruiz, Huntington Beach, CA (US); Jean-Christophe Gaudeau, Plaisir (FR); Brian Simone, Brea, CA (US); Kevin Waters, Denton, TX (US); Nahum Madrid, Denton, TX (US); Laurent Stritter, Elancourt (FR)

(73) Assignee: Safran Seats USA LLC, Gainesville, TX (US)

(*) Notice: Subject to any disclaimer, the term of this patent is extended or adjusted under 35 U.S.C. 154(b) by 0 days.

(21) Appl. No.: 16/489,979

(22) PCT Filed: Mar. 30, 2018

(86) PCT No.: PCT/US2018/025363
§ 371 (c)(1),
(2) Date: Aug. 29, 2019

(87) PCT Pub. No.: WO2018/183820
PCT Pub. Date: Oct. 4, 2018

(65) Prior Publication Data
US 2020/0002023 A1    Jan. 2, 2020

Related U.S. Application Data (60) Provisional application No. 62/478,969, filed on Mar. 30, 2017.

(51) Int. Cl.
*B64D 45/00* (2006.01)
*B64D 11/00* (2006.01)

(52) U.S. Cl.
CPC ........ *B64D 45/00* (2013.01); *B64D 11/00151* (2014.12); *B64D 11/00155* (2014.12); *B64D 2045/007* (2013.01)

(58) Field of Classification Search
CPC ......... B64D 11/0015; B64D 11/00151; B64D 11/00155; B64D 2045/007; B64D 45/00
See application file for complete search history.

(56) References Cited

U.S. PATENT DOCUMENTS

| | | | |
|---|---|---|---|
| 2010/0187354 A1 | 7/2010 | Helfrich | |
| 2012/0139308 A1* | 6/2012 | Westerink | B64D 11/0015 297/217.6 |
| 2016/0249073 A1 | 8/2016 | Margis et al. | |

FOREIGN PATENT DOCUMENTS

| | | |
|---|---|---|
| DE | 20013822 U1 | 12/2000 |
| DE | 202011100795 U1 | 10/2011 |
| EP | 1493662 A1 | 1/2005 |

OTHER PUBLICATIONS

International Patent Application No. PCT/US2018/025363, Search Report and Written Opinion, dated Jun. 1, 2018.

* cited by examiner

*Primary Examiner* — Omeed Alizada
(74) *Attorney, Agent, or Firm* — Kilpatrick Townsend & Stockton LLP (57) ABSTRACT

A communication system for a vehicle seat includes a visual indicator having a lighting mechanism configured to display a plurality of colors, a control portion electrically connected to the visual indicator, and a plurality of modes. Each mode may be associated with one of the plurality of Selection of one of the plurality of modes causes the control portion to signal the lighting mechanism to display the color associated with the selected mode.

14 Claims, 6 Drawing Sheets

PASSENGER COMMUNICATION SYSTEM

CROSS REFERENCE TO RELATED APPLICATION

This application is related to and claims priority benefit from U.S. Provisional Application No. 62/478,969 ("the '969 application"), filed on Mar. 30, 2017 entitled NEW GENERATION OF ECONOMY CLASS OFFERING ENHANCED PASSENGER EXPERIENCE. The '969 application is hereby incorporated in its entirety by this reference.

FIELD OF THE INVENTION

The field of the invention relates to communication systems for passengers in seats for aircraft or the like.

BACKGROUND

Arrangements of passenger seats, and particularly arrays of passenger seats in vehicles or aircraft, are designed to ensure passenger safety, comfort, and convenience along with maximizing efficiencies related to tasks within the cabin of the vehicle including for example, distributing objects to the passengers or responding to requests for assistance. In some instances, space in walkways/aisles of a vehicle cabin is limited due to standing passengers or airline products (such as beverage/meal carts). Conventional seats do not include any system for quickly identifying a plurality of statuses or conditions for a passenger of the seat. Flight attendants moving through the cabin of an aircraft may view visual indicators for each passenger, which will increase efficiency for typical airline tasks, expedite responses to medical concerns, and improve passenger experiences by limiting wait times and reducing unnecessary interruptions.

In certain situations, it may be desirable to include a one-way communication system for a passenger seat that allows a passenger to provide notification of a status or condition such that the flight attendant can recognize the status without walking to the seat and/or without verbal communication with the passenger.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a communication system for a vehicle seat comprises: a visual indicator comprising a lighting mechanism configured to display a plurality of colors; a control portion electrically connected to the visual indicator; and a plurality of modes, wherein: each mode is associated with one of the plurality of colors; and selection of one of the plurality of modes causes the control portion to signal the lighting mechanism to display the color associated with the selected mode.

In some embodiments, the visual indicator displays a distinct visual indicia for each mode and the visual indicator comprises an LED light.

In certain embodiments, the plurality of modes comprises a Do Not Disturb mode wherein the visual indicator illuminates as a solid red light.

In some embodiments, the plurality of modes comprises a Wake Me for Meals/Beverage mode wherein the visual indicator illuminates as a solid blue light.

The plurality of modes, in certain embodiments, comprises at least three of a Do Not Disturb mode, a Wake Me for Meals/Beverage mode, a Need Assistance mode, a Wake Me for Duty-Free mode, a Medical Emergency mode, and a Vacant Seat mode.

In certain embodiments, the visual indicator is disposed on an upper surface of a seatback.

The visual indicator, in certain embodiments, further comprises an auxiliary light disposed in a gap in the seatback.

In certain embodiments, the control portion comprises a master switch for selecting among the plurality of modes and wherein the master switch is a mechanical or electronic switch.

The communication system, in certain embodiments, further comprises a display screen, wherein the control portion comprises a master switch for selecting among the plurality of modes and wherein at least one of the plurality of modes is visually represented on the display screen.

In some embodiments, the communication system further comprises a display screen, wherein the control portion comprises a master switch to open a sub-menu on the display screen, wherein the sub-menu illustrates at least two of the plurality of modes on the display screen.

According to certain embodiments of the present invention, a passenger seat for an aircraft comprises: a communication system comprising a visual indicator, a control portion electrically connected to the visual indicator, and a plurality of modes such that the visual indicator displays a distinct visual indicia for each mode, wherein: the visual indicator comprises at least one of a light and a display screen; and the visual indicator is disposed on a seatback located in front of a seated position for interfacing with the control portion.

In certain embodiments, the plurality of modes comprises at least a Do Not Disturb mode, a Wake Me for Meals/Beverage mode, and a Need Assistance mode.

In some embodiments, for the Do Not Disturb mode, the visual indicator illuminates as a solid red light.

In certain embodiments, for the Wake Me for Meals/Beverage mode, the visual indicator illuminates as a solid blue light.

In some embodiments, for the Need Assistance mode, the visual indicator illuminates as a solid purple light.

The plurality of modes, in certain embodiments, further comprises at least one of a Wake Me for Duty-Free mode, a Medical Emergency mode, and a Vacant Seat mode.

In some embodiments, the visual indicator further comprises an auxiliary light disposed in a gap in the seatback.

The control portion, in certain embodiments, comprises a master switch for selecting among the plurality of modes and wherein the master switch is a mechanical or electronic switch.

In certain embodiments, the passenger seat further comprises a display screen, wherein the control portion comprises a master switch for selecting among the plurality of modes and wherein at least one of the plurality of modes is visually represented on the display screen.

The passenger seat, in certain embodiments, further comprises a display screen, wherein the control portion comprises a master switch to open a sub-menu on the display screen, wherein the sub-menu illustrates at least two of the plurality of modes on the display screen.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-3C illustrate embodiments of passenger seats 100 that include a communication system for each passenger. The communication system may include a visual indicator 101 and a control portion 200 where the visual indicator 101 and the control portion 200 are electrically connected to one another. In some cases, the visual indicator 101 is located on the top of the passenger seat 100 immediately in front of the passenger. In other words, the visual indicator 101 is disposed on a seatback located in front of a seated position for interfacing with the control portion 200. The visual indicator 101 may include a light, a small display screen, a combination thereof, or any other appropriate device. In some embodiments, the visual indicator 101 is a light-emitting diode (LED) or an array of LEDs. The visual indicator 101 may have the option of showing multiple colors, projected shapes/patterns, patterns of blinking lights, text, symbols, combinations thereof, or any other appropriate visual indicia.

Figure 1:
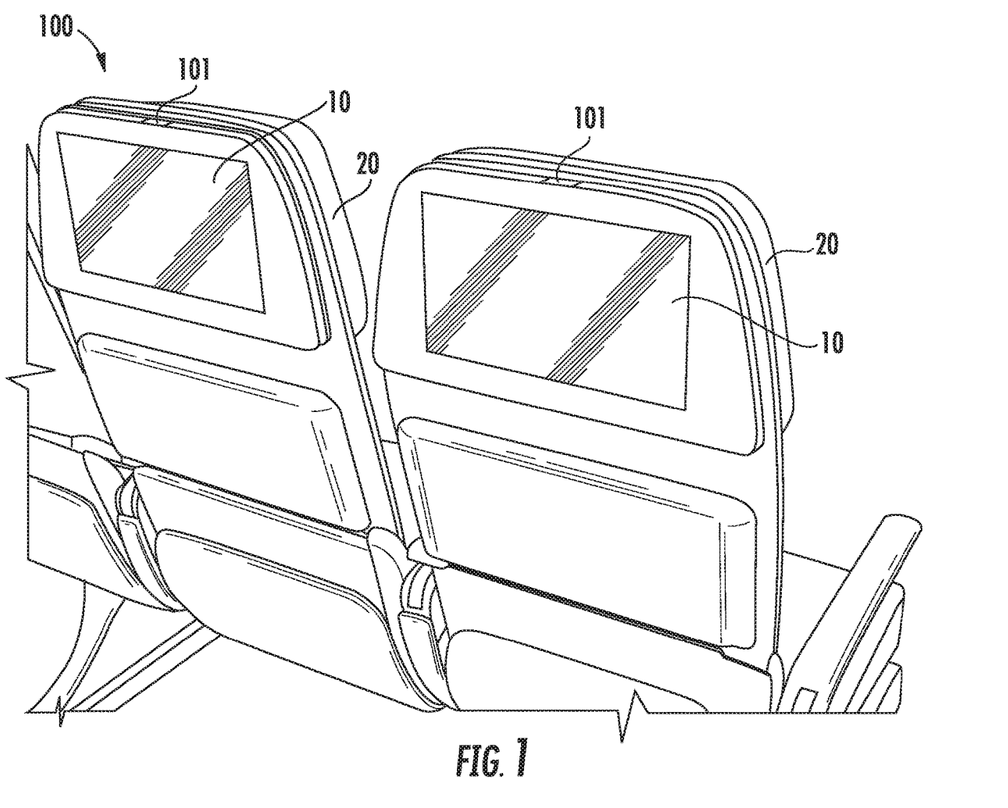
FIG. 1 is a rear perspective view of a passenger seat according to certain embodiments of the present invention.
Figure 2:
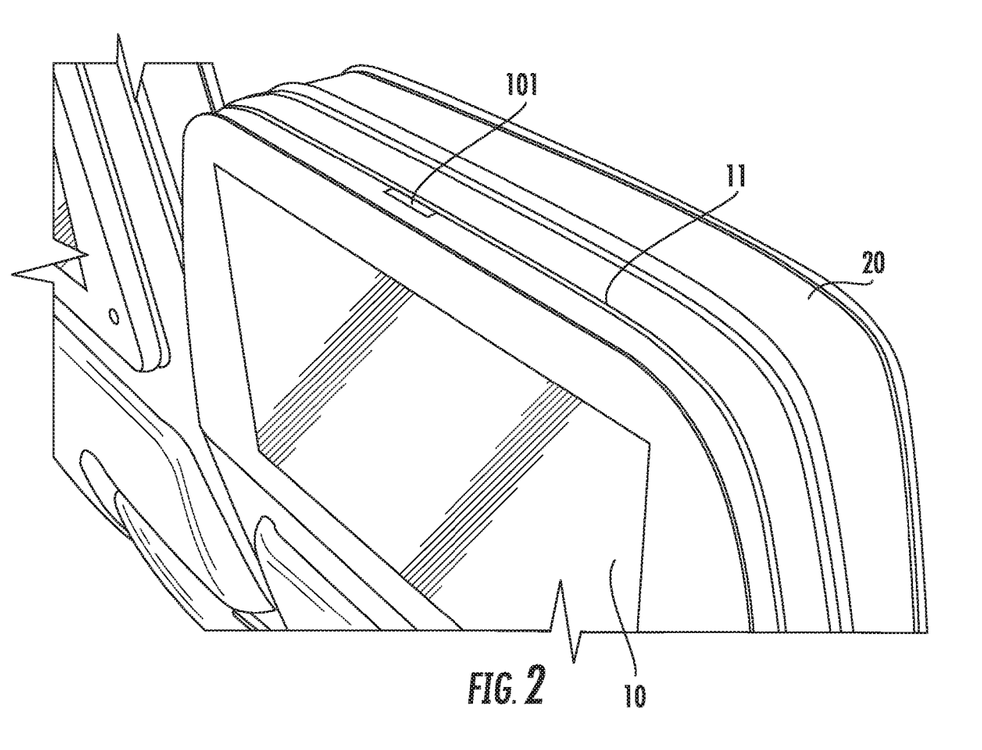
FIG. 2 is a detail perspective view of the passenger seat of FIG. 1.

As shown in FIGS. 1 and 2, the visual indicator 101 may be located on an upper surface of a seatback 20 directly in front of the passenger that controls/operates the control portion 200. In some cases, the seatback 20 may include a display screen 10 that is electrically connected to the visual indicator 101, although this is not necessary (i.e., the visual indicator 101 may be included in a seat that does not include a display screen). In addition, as shown in FIG. 2, the passenger seat 100 may include an auxiliary light 11 in a gap between the seatback 20 and the display screen 10. The auxiliary light 11 may operate in addition to or in lieu of the visual indicator 101. In some embodiments, the auxiliary light 11 operates independently of the visual indicator 101. The visual indicator 101 may include a plurality of LED light sources, which allow the visual indicator 101 to display a plurality of colors.

The visual indicator 101 may include a plurality of modes. For example, in a first mode during a flight in an aircraft, a passenger may need to alert a flight attendant that he/she should not be disturbed for any reason (i.e., Do Not Disturb mode). The visual indicator 101 may include a second mode asking for the flight attendant to wake or alert the passenger for a meal/beverage being distributed by the airline (i.e., Wake Me for Meals/Beverage mode). The visual indicator 101 may include a third mode asking for the flight attendant to wake or alert the passenger for duty-free products being sold in the aircraft (i.e., Wake Me for Duty-Free mode). The visual indicator 101 may include a fourth mode asking for the flight attendant for assistance (i.e., Need Assistance mode). The visual indicator 101 may include a fifth mode asking for immediate medical attention (i.e., Medical Emergency mode). The visual indicator 101 may include a sixth mode to indicate to other passengers and/or flight attendants that the seat is vacant (i.e., Vacant Seat mode). Although six modes are described above, alternative and/or additional modes may be included.

The Do Not Disturb mode (the first mode) may be represented by at least one of a color, a symbol, a blinking pattern, a combination thereof, or any other appropriate indicator. For example, the visual indicator 101 may illuminate a solid yellow or red color (or any other color). In some embodiments, the visual indicator 101 may illuminate a solid color with a single horizontal or diagonal line (or a pair of diagonal lines forming an "X"). The line(s) may be black, white, and/or any other appropriate color. In some embodiments, the visual indicator 101 may blink showing a solid color, a solid color with at least one line (as described above), or may alternate between these representations (or may alternate with other appropriate representations).

The Wake Me for Meals/Beverage mode (the second mode) may be represented by at least one of a color, a symbol, a blinking pattern, a combination thereof, or any other appropriate indicator. For example, the visual indicator 101 may illuminate a solid blue color (or any other color). In some embodiments, the visual indicator 101 may illuminate a solid color with a symbol of a fork and/or a knife. In some embodiments, the visual indicator 101 may blink showing a solid color, a solid color with a symbol of a fork and/or a knife (as described above), or may alternate between these representations (or may alternate with other appropriate representations).

The Wake Me for Duty-Free mode (the third mode) may be represented by at least one of a color, a symbol, a blinking pattern, a combination thereof, or any other appropriate indicator. For example, the visual indicator 101 may illuminate a solid green color (or any other color). In some embodiments, the visual indicator 101 may illuminate a solid color with a currency symbol and/or a symbol of a bottle. In some embodiments, the visual indicator 101 may blink showing a solid color, a solid color with a currency symbol and/or a symbol of a bottle (as described above), or may alternate between these representations (or may alternate with other appropriate representations).

The Need Assistance mode (the fourth mode) may be represented by at least one of a color, a symbol, a blinking pattern, a combination thereof, or any other appropriate indicator. For example, the visual indicator 101 may illuminate a solid purple color (or any other color). In some embodiments, the visual indicator 101 may illuminate a solid color with a symbol such as a question mark. In some embodiments, the visual indicator 101 may blink showing a solid color, a solid color with a question mark (as described above), or may alternate between these representations (or may alternate with other appropriate representations).

The Medical Emergency mode (the fifth mode) may be represented by at least one of a color, a symbol, a blinking pattern, a combination thereof, or any other appropriate indicator. For example, the visual indicator 101 may illuminate a solid red color (or any other color). In some embodiments, the visual indicator 101 may illuminate a solid color with a symbol such as the Star of Life or a red cross ("+") symbol. In some embodiments, the visual indicator 101 may blink showing a solid color, a solid color with a symbol such as the Star of Life or a red cross ("+") symbol (as described above), or may alternate between these representations (or may alternate with other appropriate representations). In some embodiments, the fifth mode may include a rapid or strobe blinking pattern.

The Vacant Seat mode (the sixth mode) may be represented by at least one of a color, a symbol, a blinking pattern, a combination thereof, or any other appropriate indicator. For example, the visual indicator 101 may illuminate a solid white color (or any other color). In some embodiments, the visual indicator 101 may illuminate a solid color with a symbol such as "Ø" or "{ }". In some embodiments, the visual indicator 101 may blink showing a solid color, a symbol such as "Ø" or "{ }" (as described above), or may alternate between these representations (or may alternate with other appropriate representations).

Figure 3A:
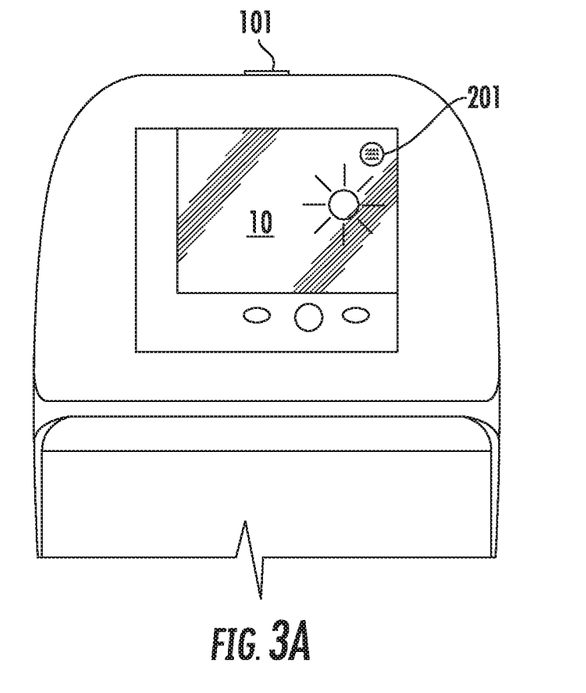
FIGS. 3A, 3B, and 3C are rear views of the passenger seat of FIG. 1.
Figure 3B:
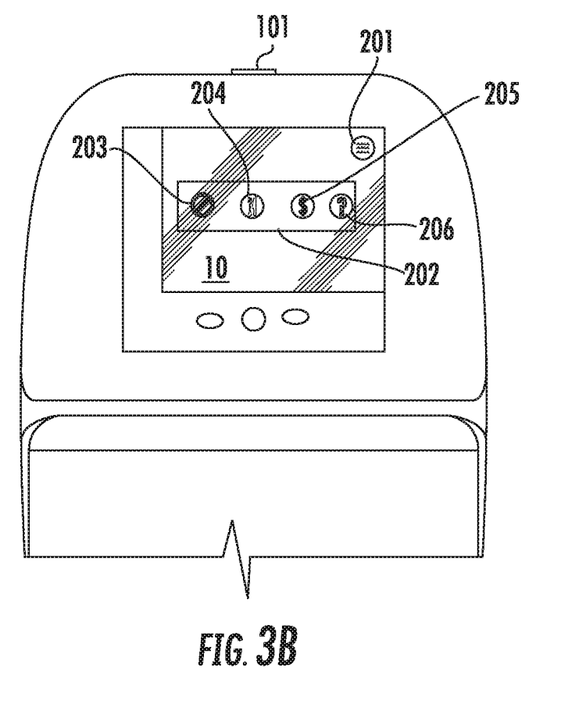
Figure 3C:
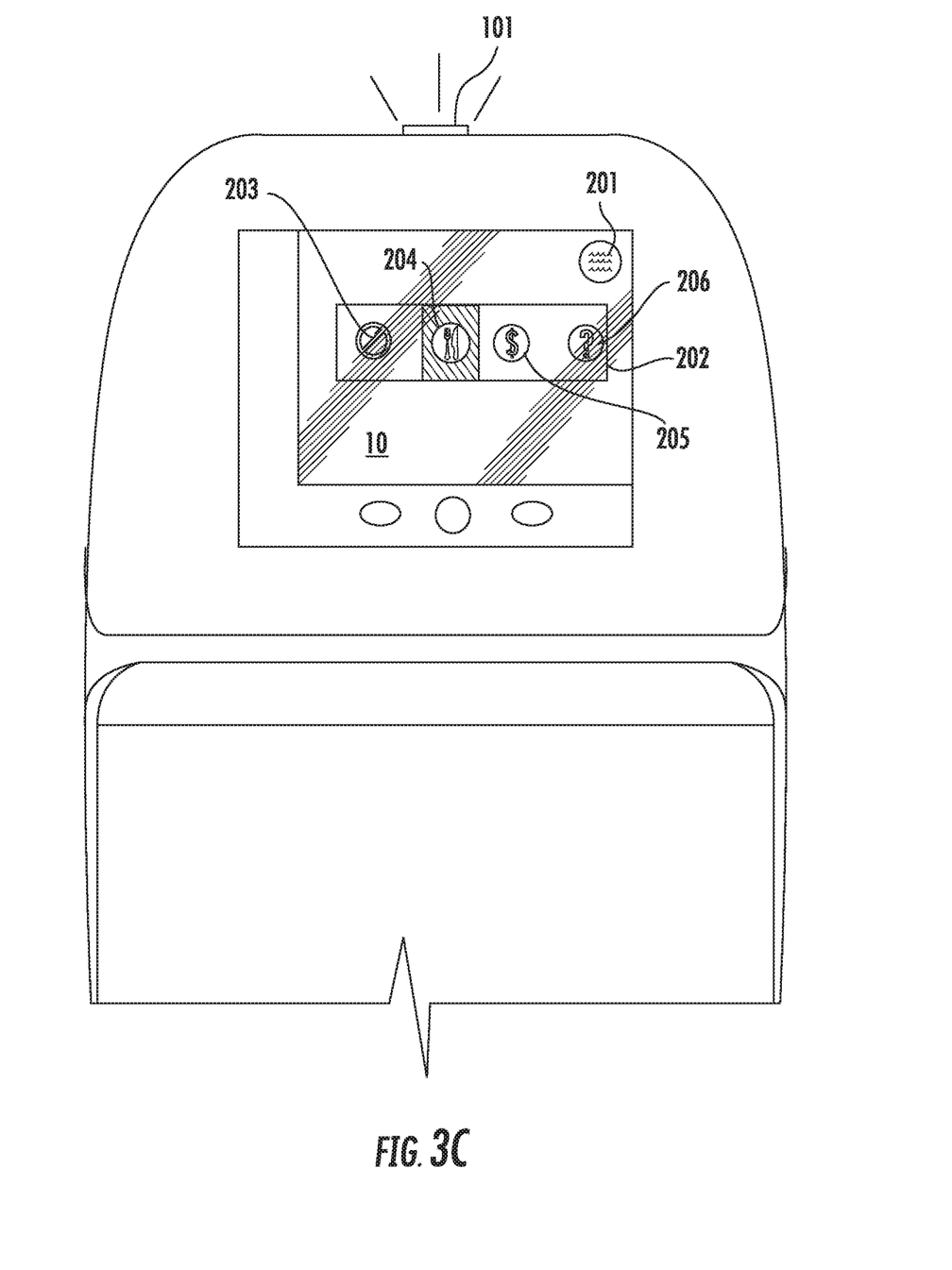

As shown in FIGS. 3A-3C, the communication system may include a control portion 200. The control portion 200 may include a master switch 201 that is on or adjacent to the display screen 10. The master switch 201 may be located on the rear side of the seat 100 (whether the seat 100 includes a display screen 10 or not). In some embodiments, the master switch 201 may be located on an armrest of the passenger's seat or in any other appropriate location. In certain embodiments, the master switch 201 is a mechanical and/or electronic switch that controls the visual indicator 101 and/or the auxiliary light 11 such that the passenger can select one of the modes described above. The master switch 201 may be a rotary switch, a multi-position switch, or any other appropriate switch. In other embodiments, the master switch 201 activates a menu and/or logic on the display screen 10 and, in some cases, the master switch 201 is an icon on the display screen 10.

In some embodiments, the master switch 201 can open a sub-menu 202 on the display screen 10. As shown in FIG. 3B, the sub-menu 202 may include icons for a plurality of modes of the visual indicator 101. FIG. 3B shows icons 203-206, but the sub-menu 202 may include any number of icons for various modes including, but not limited to, the six modes described above. In some cases, the sub-menu 202 may be customizable by the airline and/or the individual passenger such that the sub-menu 202 may include more or fewer icons.

FIG. 3B shows one example of the sub-menu 202 that includes a first icon 203 for the Do Not Disturb mode, a second icon 204 for the Wake Me for Meals/Beverage mode, a third icon 205 for the Wake Me for Duty-Free mode, and a fourth icon 206 for the Need Assistance mode. In some embodiments, the sub-menu 202 can be controlled/manipulated via a touchscreen interface and/or via external buttons not on the surface of the display screen 10.

FIG. 3C illustrates one example of the sub-menu 202 where one of the modes has been activated. In some embodiments, as shown in FIG. 3C, the portion of the sub-menu 202 surrounding the second icon 204 is illuminated or highlighted to indicate that the Wake Me for Meals/Beverage mode has been selected. The visual indicator 101 is activated with the appropriate visual indicia. In some embodiments, the sub-menu 202 will disappear from the display screen 10 after a set time interval after a mode has been selected, while in other embodiments, the sub-menu 202 will remain on the screen until the passenger selects another object or portion of the display screen 10. In other embodiments, the sub-menu 202 will immediately disappear from the display screen 10 when a mode is selected.

Figure 4:
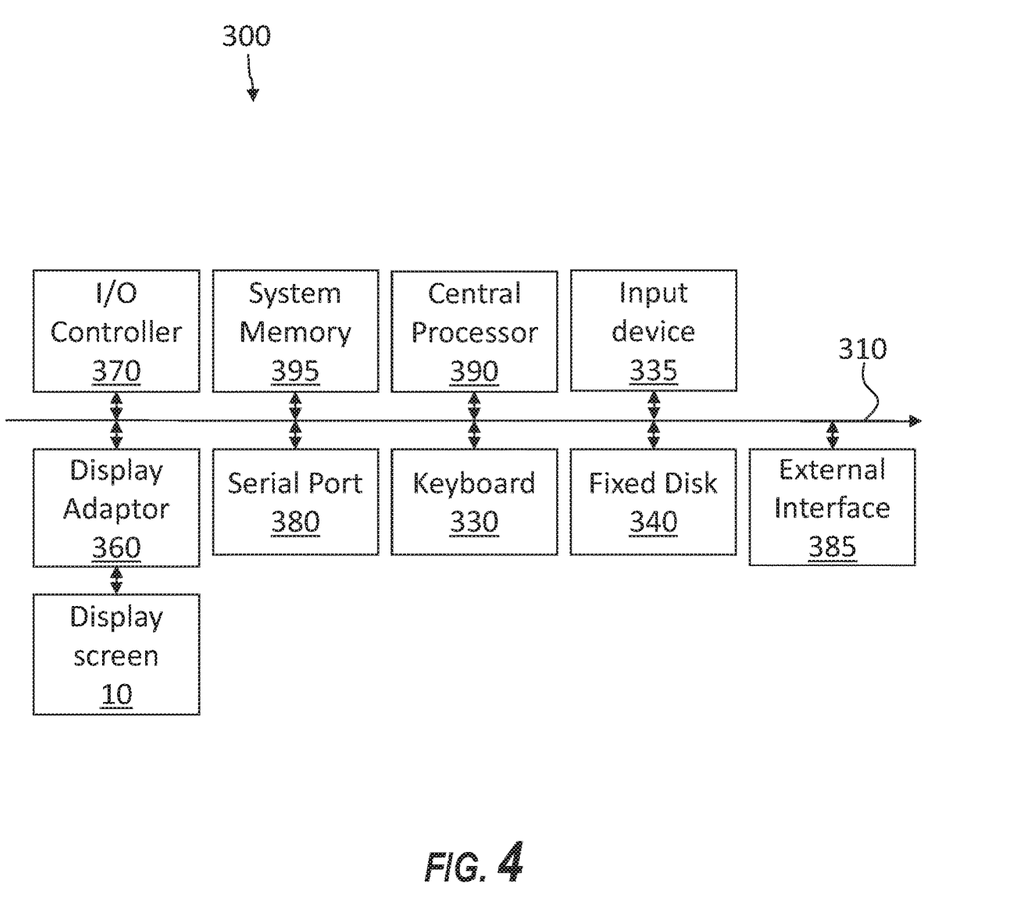
FIG. 4 is a diagram of a computer apparatus according to certain embodiments of the present invention.

FIG. 4 illustrates an interface system 300. In some aspects, the interface system 300 may be used with the communication system; however, in various other examples, the interface system 300 may be used with various other types of devices.

In some embodiments, the functions and processes of one or more components of the system 300 to facilitate communication, such as the processes illustrated in FIG. 5 and described below, can be implemented by computer program instructions.

The functions of one or more of the components can be implemented by computer program instructions. These computer program instructions can be provided to a processor of a general purpose computer, special purpose computer, and/or other programmable data processing apparatus to produce a machine, such that the instructions, which execute via the processor of the computer and/or other programmable data processing apparatus, create a mechanism for implementing the functions of the components specified in the block diagrams. These computer program instructions can also be stored in a non-transitory computer-readable memory that can direct a computer or other programmable data processing apparatus to function in a particular manner, such that the instructions stored in the non-transitory computer-readable memory produce an article of manufacture including instructions, which implement the function specified in the block diagrams and associated description. The computer program instructions can also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions of the components specified in the block diagrams and the associated description.

Accordingly, the system 300 described herein can be embodied at least in part in hardware and/or in software (including firmware, resident software, micro-code, etc.). Furthermore, aspects of the system 300 can take the form of a computer program product on a computer-usable or computer-readable storage medium having computer-usable or computer-readable program code embodied in the medium for use by or in connection with an instruction execution system. A computer-usable or computer-readable medium can be any non-transitory medium that is not a transitory signal and can contain or store the program for use by or in connection with the instruction or execution of a system, apparatus, or device. The computer-usable or computer-readable medium can be, for example but not limited to, an electronic, magnetic, optical, electromagnetic, infrared, or semiconductor system, apparatus or device. More specific examples (a non-exhaustive list) of the computer-readable medium can include the following: a portable computer diskette; a random access memory; a read-only memory; an erasable programmable read-only memory (or Flash memory); and a portable compact disc read-only memory.

FIG. 4 is a diagram of a computer apparatus 300 according to some embodiments. The various participants and elements may use any suitable number of subsystems in the computer apparatus 300 to facilitate the functions described herein. Examples of such subsystems or components are shown in FIG. 4. The subsystems shown in FIG. 4 may be interconnected via a system bus 310. Additional subsystems such as a keyboard 330, input device 335, a fixed disk 340 (or other memory comprising computer-readable media), display screen 10, which is coupled to display adapter 360, and others are shown. In various examples, these and other various user interfaces may be configured to receive inputs from the passenger/user, such as a desired mode for the visual indicator 101. Various other inputs and outputs may be provided through the user interfaces. The keyboard 330 may be an external device or may be a virtual keyboard displayed on a touchscreen surface (e.g., display screen 10). The input device 335 may be master switch 201 or any other appropriate input.

Peripherals and input/output (I/O) devices (not shown), which couple to I/O controller 370, can be connected to the computer system by any number of means known in the art, such as serial port 380. For example, serial port 380 or external interface 385 can be used to connect the computer apparatus 300 to a wide area network such as the Internet, a mouse input device, or a scanner. The interconnection via system bus allows the central processor 390 to communicate with each subsystem and to control the execution of instructions from system memory 395 or the fixed disk 340, as well as the exchange of information between subsystems. The system memory 395 and/or the fixed disk 340 may embody a computer-readable medium.

The software components or functions described in this application may be implemented as software code to be executed by one or more processors using any suitable computer language such as, for example, Java, C++, Fortran, C, or Perl using, for example, conventional or object-oriented techniques. The software code may be stored as a series of instructions or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information-processing device to perform a set of steps disclosed in embodiments of the invention. Based on the disclosure and teachings provided herein, a person of ordinary skill in the art will appreciate other ways and/or methods to implement the invention. In embodiments, any of the entities described herein may be embodied by a computer that performs any or all of the functions and steps disclosed.

Figure 5:
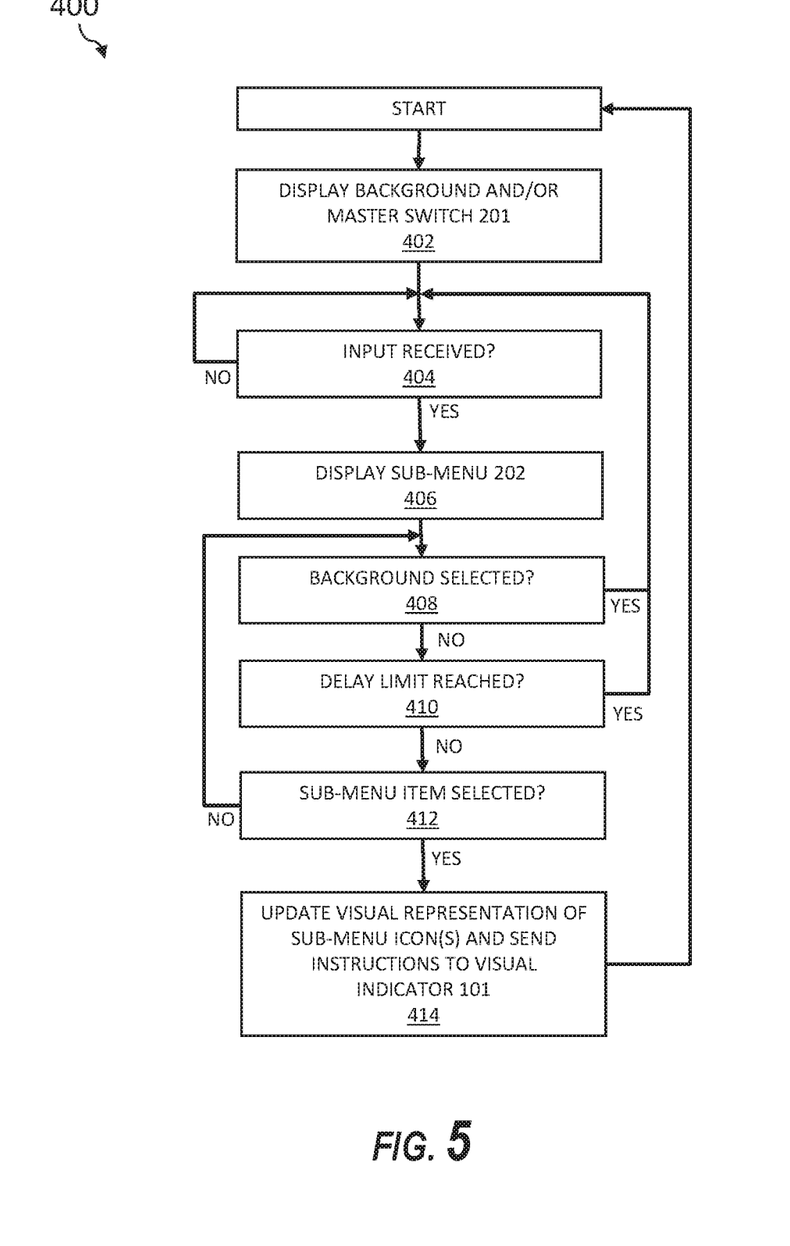
FIG. 5 is a flowchart of an exemplary process performed by the computer apparatus of FIG. 4.

FIG. 5 shows a flowchart of exemplary steps of a method 400 that may be taken using the system 300 to operate the communication system. In one aspect, in step 402, the method 400 includes displaying background and/or the master switch 201. For example, the display screen 10 may show a background image and, in some embodiments, shows the master switch 201, while in other embodiments, the master switch 201 is a physical switch separate from the display screen 10.

In some embodiments, in a step 404, the method 400 includes checking for input received. As shown in FIG. 5, step 404 may repeat until input is received such that the method 400 proceeds to step 406 where the sub-menu 202 is displayed. In step 408, the method 400 checks to determine if the background is selected and, if the background is selected, the process 400 returns to step 404. If the background is not selected, the process 400 moves to step 410 where the process checks to see if a delay limit has been reached. If the delay is reached before a sub-menu item is selected, the process 400 returns to step 404. When one of the sub-menu items is selected (step 412), the process 400 moves to step 414. In step 414, a visual representation of a sub-menu icon is updated and a corresponding instruction is sent to the visual indicator 101. For example, if no mode for the visual indicator 101 was active before step 412, the icon (e.g., 203-206) of the selected mode is illuminated or highlighted during step 414 (e.g., as shown in FIG. 3). In addition, an instruction is sent to activate the visual indicator 101 with the appropriate visual indicia. If one of the modes for the visual indicator 101 was active before step 412, when the process reaches step 414, either (a) the icon of the previously active mode is deactivated (if the active mode was selected—i.e., to turn off the active mode) or (b) the icon for a newly selected mode is illuminated or highlighted (e.g., as shown in FIG. 3) while simultaneously, the icon for the previously active is deactivated. In addition, an instruction is sent to either (a) deactivate the visual indicator 101 (b) change the visual indicator 101 from the previously active mode to the newly selected mode with the appropriate visual indicia. Although not illustrated in FIG. 5, in some embodiments, there may be a delay in the process 400 after step 414 before the sub-menu 202 disappears and the process returns to step 402. After step 414, as described above, in some embodiments, the sub-menu 202 will disappear from the display screen 10 after a set time interval after a mode has been activated/deactivated, while in other embodiments, the sub-menu 202 will remain on the screen until the passenger selects another object or portion of the display screen 10. In other embodiments, the sub-menu 202 will immediately disappear from the display screen 10 when a mode is selected.

The components of the communication system may be formed of materials including, but not limited to, polyester, nylon, plastic, carbon composite, thermoplastic, aluminum, steel, other fabric materials, stainless steel, other plastic or polymer materials, other metallic materials, other composite materials, or other similar materials. Moreover, the components of the communication system may be attached to one another via suitable fasteners, which include, but are not limited to, screws, bolts, rivets or other mechanical or chemical fasteners.

In the following, further examples are described to facilitate understanding of aspects of the invention.

Example A. A communication system for a vehicle seat, the communication system comprising:

a visual indicator comprising a lighting mechanism configured to display a plurality of colors;

a control portion electrically connected to the visual indicator; and a plurality of modes, wherein:

each mode is associated with one of the plurality of colors; and selection of one of the plurality of modes causes the control portion to signal the lighting mechanism to display the color associated with the selected mode.

Example B. The communication system of Example A or any of the preceding or subsequent examples, wherein the visual indicator displays a distinct visual indicia for each mode and the visual indicator comprises an LED light.

Example C The communication system of Example A or any of the preceding or subsequent examples, wherein the plurality of modes comprises a Do Not Disturb mode wherein the visual indicator illuminates as a solid red light.

Example D. The communication system of Example A or any of the preceding or subsequent examples, wherein the plurality of modes comprises a Wake Me for Meals/Beverage mode wherein the visual indicator illuminates as a solid blue light.

Example E. The communication system of Example A or any of the preceding or subsequent examples, wherein the plurality of modes comprises at least three of a Do Not Disturb mode, a Wake Me for Meals/Beverage mode, a Need Assistance mode, a Wake Me for Duty-Free mode, a Medical Emergency mode, and a Vacant Seat mode.

Example F. The communication system of Example A or any of the preceding or subsequent examples, wherein the visual indicator is disposed on an upper surface of a seatback.

Example G. The communication system of Example F or any of the preceding or subsequent examples, wherein the visual indicator further comprises an auxiliary light disposed in a gap in the seatback.

Example H. The communication system of Example A or any of the preceding or subsequent examples, wherein the control portion comprises a master switch for selecting among the plurality of modes and wherein the master switch is a mechanical or electronic switch.

Example I. The communication system of Example A or any of the preceding or subsequent examples, further comprising a display screen, wherein the control portion comprises a master switch for selecting among the plurality of modes and wherein at least one of the plurality of modes is visually represented on the display screen.

Example J. The communication system of Example A or any of the preceding or subsequent examples, further comprising a display screen, wherein the control portion comprises a master switch to open a sub-menu on the display screen, wherein the sub-menu illustrates at least two of the plurality of modes on the display screen.

Example K. A passenger seat for an aircraft comprising:

a communication system comprising a visual indicator, a control portion electrically connected to the visual indicator, and a plurality of modes such that the visual indicator displays a distinct visual indicia for each mode, wherein:

the visual indicator comprises at least one of a light and a display screen; and the visual indicator is disposed on a seatback located in front of a seated position for interfacing with the control portion.

Example L. The passenger seat of Example K or any of the preceding or subsequent examples, wherein the plurality of modes comprises at least a Do Not Disturb mode, a Wake Me for Meals/Beverage mode, and a Need Assistance mode.

Example M. The passenger seat of Example L or any of the preceding or subsequent examples, wherein, for the Do Not Disturb mode, the visual indicator illuminates as a solid red light.

Example N. The passenger seat of Example L or any of the preceding or subsequent examples, wherein, for the Wake Me for Meals/Beverage mode, the visual indicator illuminates as a solid blue light.

Example O. The passenger seat of Example L or any of the preceding or subsequent examples, wherein, for the Need Assistance mode, the visual indicator illuminates as a solid purple light.

Example P. The passenger seat of Example L or any of the preceding or subsequent examples, wherein the plurality of modes further comprises at least one of a Wake Me for Duty-Free mode, a Medical Emergency mode, and a Vacant Seat mode.

Example Q. The passenger seat of Example K or any of the preceding or subsequent examples, wherein the visual indicator further comprises an auxiliary light disposed in a gap in the seatback.

Example R. The passenger seat of Example K or any of the preceding or subsequent examples, wherein the control portion comprises a master switch for selecting among the plurality of modes and wherein the master switch is a mechanical or electronic switch.

Example S. The passenger seat of Example K or any of the preceding or subsequent examples, further comprising a display screen, wherein the control portion comprises a master switch for selecting among the plurality of modes and wherein at least one of the plurality of modes is visually represented on the display screen.

Example T. The passenger seat of Example K or any of the preceding or subsequent examples, further comprising a display screen, wherein the control portion comprises a master switch to open a sub-menu on the display screen, wherein the sub-menu illustrates at least two of the plurality of modes on the display screen.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A communication system for a vehicle seat, the communication system comprising:

a visual indicator comprising a lighting mechanism configured to display a plurality of colors;

a display screen;

a control portion electrically connected to the visual indicator and comprising a master switch for opening a sub-menu on the display screen; and a plurality of modes, wherein:

each mode is associated with one of the plurality of colors; and selection of one of the plurality of modes causes the control portion to signal the lighting mechanism to display the color associated with the selected mode; and wherein the master switch is an icon on the display screen and the sub-menu illustrates at least two of the plurality of modes on the display screen;

wherein the sub-menu includes icons for a plurality of modes of the visual indicator; and wherein the sub-menu is controllable via a touchscreen interface.

2. The communication system of claim 1, wherein the visual indicator displays a distinct visual indicia for each mode and the visual indicator comprises an LED light.

3. The communication system of claim 1, wherein the plurality of modes comprises a Do Not Disturb mode wherein the visual indicator illuminates as a solid red light.

4. The communication system of claim 1, wherein the plurality of modes comprises a Wake Me for Meals/Beverage mode wherein the visual indicator illuminates as a solid blue light.

5. The communication system of claim 1, wherein the plurality of modes comprises at least three of a Do Not Disturb mode, a Wake Me for Meals/Beverage mode, a Need Assistance mode, a Wake Me for Duty-Free mode, a Medical Emergency mode, and a Vacant Seat mode.

6. The communication system of claim 1, wherein the visual indicator is disposed on an upper surface of a seatback.

7. The communication system of claim 6, wherein the visual indicator further comprises an auxiliary light disposed in a gap in the seatback.

8. A passenger seat for an aircraft comprising:

a communication system comprising a visual indicator, a display screen, a control portion electrically connected to the visual indicator, and a plurality of modes such that the visual indicator displays a distinct visual indicia for each mode, wherein:

the visual indicator comprises at least one of a light and a display screen; and the visual indicator is disposed on a seatback located in front of a seated position for interfacing with the control portion;

the control portion further comprises a master switch for opening a sub-menu on the display screen, wherein the master switch is an icon on the display screen and the sub-menu illustrates at least two of the plurality of modes on the display screen; and the sub-menu includes icons for a plurality of anodes of the visual indicator; and the sub-menu is controllable via a touchscreen interface.

9. The passenger seat of claim 8, wherein the plurality of modes comprises at least a Do Not Disturb mode, a Wake Me for Meals/Beverage mode, and a Need Assistance mode.

10. The passenger seat of claim 9, wherein, for the Do Not Disturb mode, the visual indicator illuminates as a solid red light.

11. The passenger seat of claim 9, wherein, for the Wake Me for Meals/Beverage mode, the visual indicator illuminates as a solid blue light.

12. The passenger seat of claim 9, wherein, for the Need Assistance mode, the visual indicator illuminates as a solid purple light.

13. The passenger seat of claim 9, wherein the plurality of modes further comprises at least one of a Wake Me for Duty-Free mode, a Medical Emergency mode, and a Vacant Seat mode.

14. The passenger seat of claim 8, wherein the visual indicator further comprises an auxiliary light disposed in a gap in the seatback.

* * * * *